United States Patent [19]

Robert et al.

[11] Patent Number: 4,612,413
[45] Date of Patent: Sep. 16, 1986

[54] AUTHENTICATION SYSTEM BETWEEN A CARD READER AND A PAY CARD EXCHANGING DATA

[75] Inventors: Serge Robert, Jouy en Josas; Olivier F. Cahart, Versailles; Pierre Le Marchant, Clamart, all of France

[73] Assignee: U.S. Philips Corporation, New York, N.Y.

[21] Appl. No.: 632,092

[22] Filed: Jul. 18, 1984

[30] Foreign Application Priority Data

Jul. 29, 1983 [FR] France ............................. 83 12528

[51] Int. Cl.⁴ .............................................. H04L 9/00
[52] U.S. Cl. ................................ 178/22.08; 178/22.09
[58] Field of Search ............... 235/379, 380, 382, 441; 178/22.08, 22.13

[56] References Cited

U.S. PATENT DOCUMENTS

| | | | |
|---|---|---|---|
| 4,105,156 | 8/1978 | Dethloff | 235/441 |
| 4,198,619 | 4/1980 | Atalla | 235/380 |
| 4,211,919 | 7/1980 | Ugon | 178/22.08 |
| 4,224,666 | 9/1980 | Giraud | 235/380 |
| 4,271,482 | 6/1981 | Giraud | 235/380 |
| 4,304,961 | 12/1981 | Campbell, Jr. | 235/380 |
| 4,328,414 | 5/1982 | Atalla | 235/380 |
| 4,453,074 | 6/1984 | Weinstein | 235/380 |
| 4,471,216 | 9/1984 | Herve | 235/380 |
| 4,578,532 | 3/1986 | Markwitz | 178/22.13 |

*Primary Examiner*—Salvatore Cangialosi
*Assistant Examiner*—Aaron J. Lewis
*Attorney, Agent, or Firm*—Jack E. Haken; James J. Cannon, Jr.

[57] ABSTRACT

A reciprocal authentication system between two groups of electronic units which can be interconnected for the exchange of data.

The system periodically supplies a variable access key for the encrypting of confidential exchanges.

7 Claims, 2 Drawing Figures

AUTHENTICATION SYSTEM BETWEEN A CARD READER AND A PAY CARD EXCHANGING DATA

BACKGROUND OF THE INVENTION

1. Field of the Invention

The invention pertains to reciprocal authentication and data exchange system, comprising a first set of readers and a second set of cards which can be freely connected to each reader, each card and each reader comprising processing and storage means which serve, in the connected state, to store, process and generate data in the card and data in the reader, to modify the data, to transfer the data to the reader and the card, respectively, and to verify the data received after the transfer, said system also comprising detection means for testing the correspondence of the signals generated after said verification and, as the case may be, for permitting further data exchanges between the interconnected card and reader whose connection is thus authenticated.

2. Description of the Prior Art

A system of this kind is known from U.S. Pat. No. 3,806,874; such a system serves to authenticate a connection, for example between a bank credit card and a credit card reader before proceeding with the exchange of data or services which are accessible only after a mutual verification: is the card a "genuine" card for the reader?; is the reader a "genuine" reader for the card? This verification serves to prevent a defrauder from making a genuine card "talk" by means of a nongenuine card, which would enable him to forge cards of adequate quality.

This system utilizes electronic processing means such as used in the data processing industry; its application is not limited to bank transactions: any exchange between data processing means can be tested by means of such an authentication system.

One of the versions of the authentication system disclosed in said Patent utilizes a random number generator (51) which is accommodated in the reader; matters are thus complicated for a prospective defrauder who observes the authentication exchanges on the lines 37 and 45 of the known system; however, subsequent data exchanges are not protected so that after authentication of a genuine card, a defrauder could replace it by another card, thus defrauding the system; moreover, a protection mode disclosed in said Patent (FIG. 12) implies a comparatively small size of the secret circuits of the card; thus represents a restriction which is not compatible with the extension of the meaning of the term "card" for data processing systems as described above in a general sense.

It is the object of the invention to eliminate these drawbacks.

SUMMARY OF THE INVENTION

To this end, an authentication and data exchange system in accordance with the invention is characterized in that said data stored in each card comprises a first secret code (S) which is specific to each card and a second secret code (s) which is linked to the first code (S) by a first bi-univocal (F1) and reverse (F1$^{-1}$) transformation function which is not specific to each card, said processing means comprising a second (F2), a third (F3) and a fourth (F4) transformation function which are not specific to each card, the processing means in each reader comprising a further first transformation function which is identical to said first transformation function (F1) which links the two secret codes (S and s) of each card, a random number generator (GEN) for generating, each time when a card is connected, a first (RT) and second (QT) random number, a further second, a further third and a further fourth transformation function which are identical to said second (F2), third (F3) and fourth (F4) transformation functions, respectively, said first secret code (S) being transferred (T1) from the card to the reader after the card has received a start signal (T0) from the reader, said transformation function (F1) of the reader transforming said first secret code (S) transferred thereto into a secret code (S1) after which, following the transfer (T2) of said first and second random numbers from the reader to the card, said processing means of the card and the reader apply, locally in parallel and respectively, said second transformation function (F2): on the one hand to RT and s in order to obtain a card access key KSC and on the other hand to RT and s1 in order to obtain a reader access key KSL, after which said third transformation function (F3) is applied on the one hand to QT and KSC in order to obtain a first comparison data DCC 1 in the card and on the other hand to QT and KSL in order to obtain a first comparison data DCL 1 in the reader, after which said fourth transformation function (F4) is applied on the one hand to DCC 1 and KSC in order to obtain a second comparison data DCC 2 in the card and on the other hand to DCL 1 and KSL in order to obtain a second comparison data DCL 2 in the reader, after the transfer (T4) of DCL 2 from the reader to the card said verification means of the card verifying that DCL 2 and DCC 2 are equal (LOK) and, in that case, authorizing the transfer (T5) of DCC 1 from the card to the reader, said verification means of the reader verifying that DCC 1 and DCL 1 are equal (COK) and, in that case, authorizing further exchanges of data between the card and the reader, an access key KS thus authenticated in that it is identical to that (KSL) of the reader and that (KSC) of the card being stored so that it is available to ensure the confidentiality of said data exchanges by encrypting.

The random number generator is thus used completely for the generation of an access key which can never be observed on the transfer line or lines by a defrauder. Moreover, because the access key is not the same from one authentication to another and the functions F1, F2, F3 and F4 can be sufficiently complex, the defrauder can neither derive some knowledge therefrom as regards the first secret code S which he could obtain by making a genuine card "talk". Nor can he derive knowledge therefrom as regards the random numbers Rt and QT and/or the second comparison data DCL 2 of the reader which he could obtain by making a genuine reader "talk". Thus it will be impossible for him to obtain the access key which he would need in order to follow the data exchange dialog.

An attractive alternative is the following.

In order to obtain a system which is more economical be it less efficient, a reciprocal authentication system in accordance with the invention is characterized in that the four transformation functions (F1, F2, F3, F4) may all be mutually identical, or identical two-by-two, or three-by-three.

The processing means of the reader as well as the card are then simpler and hence less expensive, however, the function (functions) is (are) also easier to discover. The choice of the function (functions) should be made on the basis of the desired degree of security.

Another implementation of the reciprocal authentication system in accordance with the invention is characterized in that said random generator (GEN) is accommodated in the card, the transfer (T2) of the first (RT) and the second (QT) random number taking place from the card to the reader, so that the transfers T1 and T2 can be represented by only a single transfer T12.

The processing means of the card are then slightly more elaborate, and more expensive, and less compact. However, a higher speed is obtained because the two transfers are thus combined into one transfer only.

The present invention also offers other advantages and other alternatives are also possible; they will be described in detail hereinafter with reference to the accompanying drawings which are given merely by way of example.

DESCRIPTION OF A PREFERRED EMBODIMENT

The corresponding elements of the two Figures are denoted by the same references. The transformation functions are denoted by semi-circles. The data stored, transferred or resulting from the functions are denoted by rectangles. Uninterrupted lines represent the logic flow of the data as opposed to the physical layout of the electrical conductors which need not be described in detail for a proper understanding of the invention.

Figure 1:
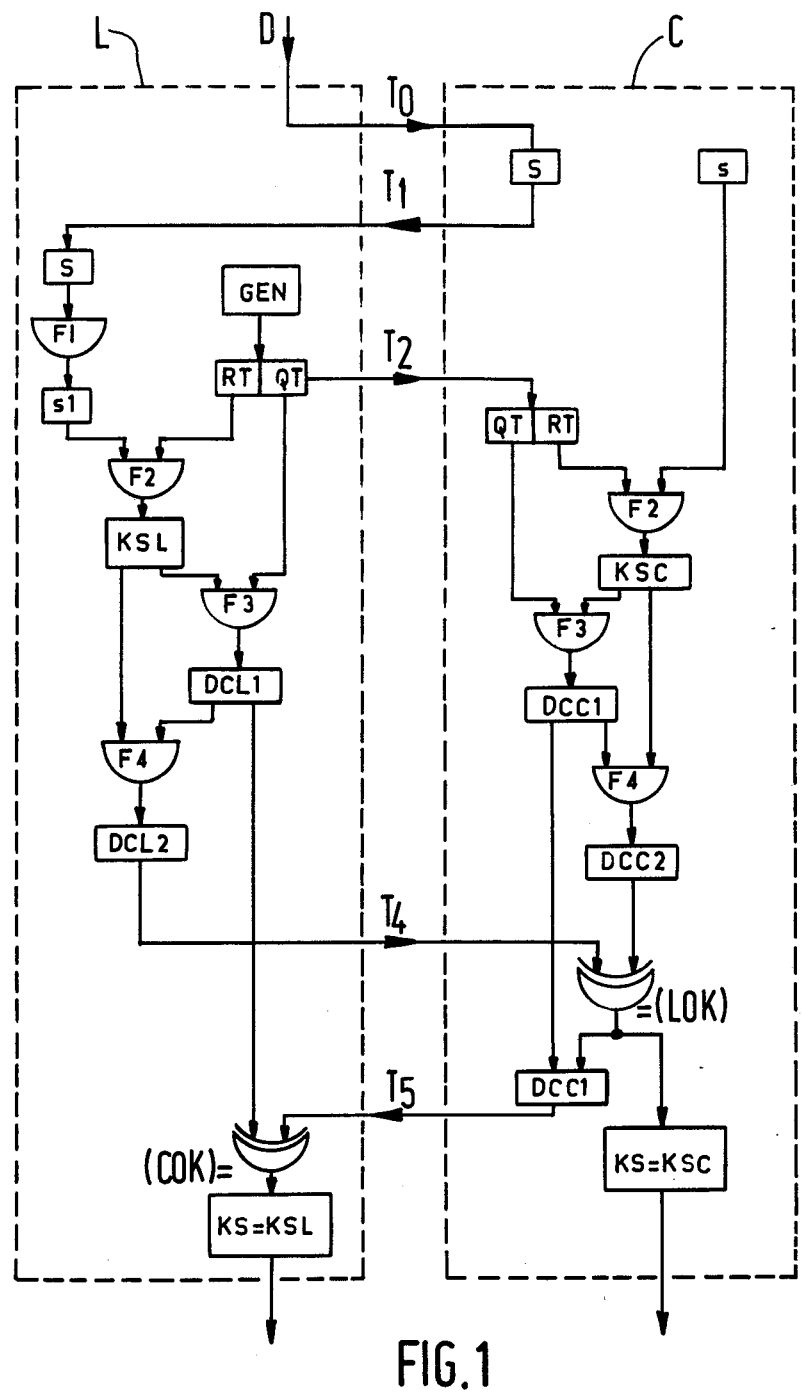
FIG. 1 shows the basic version of the authentication system.

FIG. 1 shows a reader, enclosed by a broken line L, and a card, enclosed by the broken line C, in the state in which they are interconnected by means of connections (not shown), for example, connections according to the standard AFNOR CF/TC97/SC17/gt4, published by the Association Francaise pour la Normalisation, Tour EUROPA, Cedex 792080, Paris la Defense, France.

As soon as the card is connected to the reader, a card detector, for example an end of course detector, generates a signal D which is transferred (T0) to the card; each card is constructed so that it comprises a permanent memory in which there are stored a first secret code S and a second secret code s, both codes being sepcific to each card which is thus individualized; S and s are linked by the transformation function F1$^{31\ 1}$: S—F1$^{-1}$(s). This means that S is calculated on the basis of s when the card is manufactured. The function F1$^{-1}$ is a function whose inverse function F1 is known and which is the same for all cards and all readers.

The signal D is the start signal for the reciprocal authentication system. Upon reception of this signal D, the card transfers the code S to the processing means of the reader which applies the function F1 thereto in order to obtain a result s1 which must be equal to the secret code s when a genuine card and a genuine reader are interconnected. The notation s1 is used to emphasize the differences which may arise from a fraud or a possible error.

Assuming that the random number generator GEN is independent of the processing means of the reader, which need not be necessarily so, the generator generates two random numbers RT and QT which are stored as such by the reader and transferred (T2) to the card in which they are also stored as such.

The memories of the card and the reader thus contain three identical data: RT, QT and s=s1.

The processing means of the card and the reader are constructed to comprise the same transformation functions F2, F3 and F4 which are applied to the same data as follows (see FIG. 1):

F2, in the card, is applied to RT and s and supplies a data which is referred to as the card access key KSC.

F2, in the reader, is applied to RT and s1 and supplies a data which is referred to as the reader access key KSL.

F3, in the card, is applied to QT and KSC and supplies a first comparison data DCC 1 in the card.

F3, in the reader, is applied to QT and KSL and supplies a first comparison data DCL 1 in the reader.

F4, in the card, is applied to DCC 1 and KSC and supplies a second comparison data DCC 2 in the card.

F4, in the reader, is applied to DCL 1 and KSL and supplies a second comparison data DCL 2 in the reader.

The memories of the card and the reader now each contains three data: KSC, DCC 1, DCC 2, and KSL, DCL 1, DCL 2 respectively which should normally be pairwise identical. Because it is the most complex data due to the application of the largest number of functions, the second comparison data is transferred (T4) from the reader to the card. If the comparison result of DCL 2 and DCC 2 is not satisfactory, the card remains "silent" and the authentication cannot take place. Correspondence, however, indicates that the card recognizes the reader as being genuine (=LOK) so that the card access key is validated for the subsequent exchanges (KS=KSC) and the first comparison data (DCC 1) is transferred (T5) to the reader which, in the case of correspondence to DCL 1, in its turn recognizes the card as being genuine (=COK) and validates the access key (KS=KSL). The system is then ready for any subsequent dialog between the card and the reader thus mutually authenticated. It is a substantial advantage that the messages of this dialog are encrypted with a key KS which will never be the object of a transfer on a connection and which will be variable from one authentication or "session" to another.

The fact that neither s nor KS is ever transferred allows for comparatively exposed connections. Therefore, the physical dimensions of the processing and storage means of the card are not limited thereby.

However, it may be desirable to limit the number of functions, for example for considerations of cost; this can be done only at the expense of security, but in certain cases it is advantageous to implement the processing means only for one function F which will always be applied: F=F1=F2=F3=F4; it is also possible to retain only two functions as shown in FIG. 2 in which F3 utilizes the same processing means as F2, so F3=F2, and in which F4 utilizes the same processing means as F1, so F4=F1; other combinations are equally well possible.

DESCRIPTION OF A FURTHER PREFERRED EMBODIMENT

Figure 2:
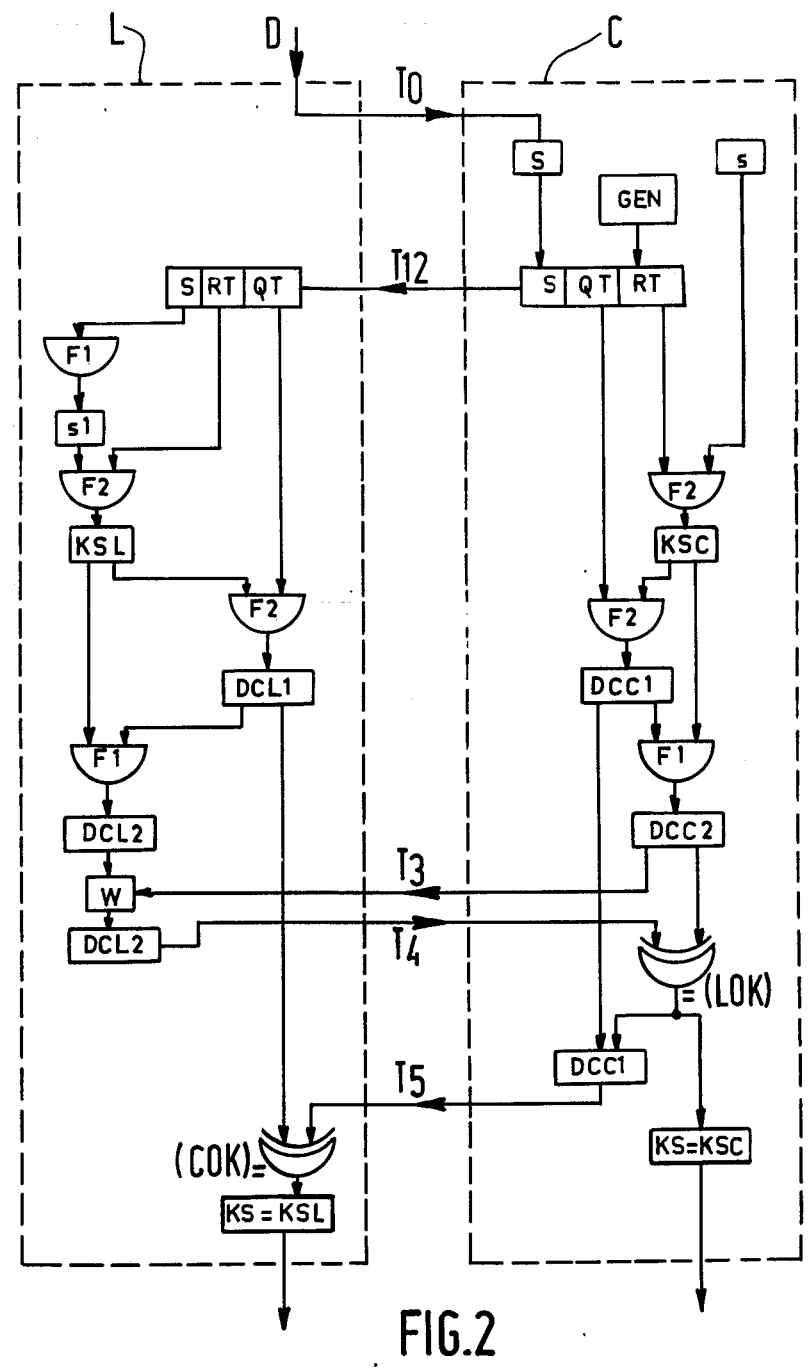
FIG. 2 shows a group of derived versions of this system.

Conversely, the system can be complicated by implementing the random number generator (GEN) in the card as indicated in FIG. 2, but without a reduction of the number of transformation functions being necessary at the same time. When the generator GEN is accommodated in the card, it is necessary to transfer the random numbers QT and RT to the reader and the transfer T2 is performed in a sense opposite to that in FIG. 1. However, this transfer may be simultaneous with the transfer (T1) of S as represented in FIG. 2 by the transfer T12. One transfer operation is thus saved and the authentication is faster.

Likewise, in a version which is not shown, the start signal may originate from the card, in which case the transfers T0, T1 and T2 may constitute only a single transfer T0 12; this would notably be the case for data processing system wherein the "card" is larger that the conventional format of a credit card, for example, in the form of a hand-held computer terminal. Such terminal could readily comprise a detector D.

In the case of pay cards or other cards of comparatively modest size, the processing means of the card may be slower than those of the reader; in that case it is advantageous for the reader to enter a waiting loop (W) until the card sends a completion signal (T3) for performing the transfer (T4) of said second comparison data DCL 2 of the reader. Preferably, the reader "talks" first (T4 before T5) because matters are thus complicated for a prospective defrauder. Of course, the transfer sequence may be reversed (T5 before T4) without major objections.

As has already been stated, it is advantageous that not only comparatively small cards can be connected and authenticated, but also larger systems; in order to take advantage of this new possibility and also to increase the various uses of cards comprising a memory, the function F1 which links S to s is preferably specific to two sub-assembles which can be interconnected; thus, for example a card issued by bank A cannot be authenticated by a reader issued by bank B; $F1 \neq F1' \neq F1'' \ldots$ When the dialog which follows the authentication and which utilizes the access key for the encrypting is particularly long or confidential, it may be advantageous to change the key periodically without necessitating a disconnection; to this end, either the reader or the card takes the initiative, on the basis of the time expired or a number of messages transmitted or otherwise, to simulate said start signal T0 in order to initiate new authentications which each time generate a new key for access and encrypting so that the dialog between the same couple which remains connected is continued; consequently, a prospective defrauder will have a quasi-impossible task because the key will be changed without his knowledge.

What is claimed is:

1. A reciprocal authentication system for mutually authenticating an interconnected reader terminal as a first station and an electronic card as a second station towards each other, said card storing a personalized first secret code (S) and personalized second secret code (S), said second secret code being linked to said first secret code by means of a first non-personalized secret transformation function (F1), said system comprising:

first transfer means (T1) for transferring said first secret code to said terminal, in said terminal first processing means for recovering by means of said first transformation function (F1) said second secret code (s1);

in one of said stations random number generating means (GEN) for generating a random number (RT, QT) as a session key and second transfer means (T2) for transferring this random number to the other station;

in either station second processing means for receiving said second secret code and a first part (RT) of said random number for generating by means of a second transformation function (F2) a reader access key and a card access key, respectively (KSL, KSC), in either station third processing means for receiving said reader access key and card access key, respectively, and furthermore a second part (QT) of said random number for generating a means of a third transformation function (F3) first reader comparison data and first card comparison data, respectively (DCL1, DCC1), in either station fourth processing means for receiving said reader access key and card access key, respectively, and furthermore said reader comaprison data and card comparison data, respectively for generating by means of a fourth transformation function (f4) second reader comparison data and second card comparison data (DLC2, DCC2), respectively, third transfer means (T4) for transferring said second reader comparison data and said second card comparison data from a sending station to a receiving station, in said receiving station first comparing means for comparing said second reader comparison data and second card comparison data and upon equality generating a first authorization signal, (LOK), fourth transfer means (T5) for transferring under control of said first authorization signal comparison data from said receiving station to said sending station, in said sending station second comparing means for comparing said first reader comparison data and first card comparison data and upon equality generating a second authorization signal (COK), the combination of said first and second authorization signals enabling further transfer of information between said two stations.

2. A system as claimed in claim 1, wherein at least two of said transformation functions are identical.

3. A system as claimed in claim 1, wherein said random number generator is situated in the card and said first and second transfer means are coexistently operative (T12).

4. A system as claimed in claim 2, wherein said card comprises start signal generating means for transferring a start signal to the reader upon reaching said interconnected state.

5. A system as claimed in claim 1, 2 or 3, wherein said processing means in said reader has a higher operating speed than said processing means in the card, said reader having waiting means (W) being activated upon completion of said generating by the fourth processing means in the reader, and being deactivated upon completion of said generating by the fourth processing means in the card communicated thereto as an enabling transfer signal (T3).

6. A card for use in a system as claimed in claim 1, 2, or 3, wherein said fourth processing means has an enabling output for communicating, upon completion of said fourth processing, an enabling transfer signal to said reader (T3).

7. a system as claimed in claim 1, said system having start signal generating means for generating, upon reaching an interconnected state, a start signal for communication (T0) between said stations, said system having repeat means for generating in said interconnected state said start signal, thereby activating said random number generator.

* * * * *